United States Patent [19]

Sims et al.

[11] Patent Number: 4,559,487

[45] Date of Patent: Dec. 17, 1985

[54] VOLTAGE REGULATOR WITH INDEPENDENT PEAK AND AVERAGE VOLTAGE SENSING

[75] Inventors: Cecil W. Sims; Arthur Hill, both of Rockford, Ill.

[73] Assignee: Sundstrand Corporation, Rockford, Ill.

[21] Appl. No.: 648,301

[22] Filed: Sep. 7, 1984

[51] Int. Cl.⁴ .................................................. H02P 9/30
[52] U.S. Cl. ......................................... 322/24; 322/25; 322/28; 322/73
[58] Field of Search ...................................... 322/22–25, 322/72, 73, 28, 59; 328/111, 112, 137; 307/84, 87

[56] References Cited

U.S. PATENT DOCUMENTS

| | | | |
|---|---|---|---|
| 3,209,233 | 9/1965 | Reuther | 322/24 |
| 3,484,704 | 12/1969 | Hungerford | 328/137 |
| 3,564,391 | 2/1971 | Dinger | 322/25 |
| 4,044,296 | 8/1977 | Dhyanchand et al. | 322/25 |
| 4,322,630 | 3/1982 | Mezera et al. | 307/87 X |
| 4,326,159 | 4/1982 | Aotsu et al. | 322/22 X |
| 4,335,344 | 6/1982 | Gant | 322/25 |
| 4,346,337 | 8/1982 | Watrous | 322/25 |
| 4,403,292 | 9/1983 | Ejzak et al. | 307/71 |
| 4,477,765 | 10/1984 | Glennon et al. | 322/25 X |

FOREIGN PATENT DOCUMENTS

| | | | |
|---|---|---|---|
| 1804130 | 4/1970 | Fed. Rep. of Germany | 322/22 |
| 813755 | 3/1981 | U.S.S.R. | 328/111 |
| 813768 | 3/1981 | U.S.S.R. | 328/111 |

Primary Examiner—R. J. Hickey
Attorney, Agent, or Firm—Wood, Dalton, Phillips, Mason & Rowe

[57] ABSTRACT

A voltage regulator for a generating system having a main generator and an exciter for providing field current to the main generator includes means coupled to the main generator for sensing at least two operating parameters thereof. Means are coupled to the sensing means for generating pulse width modulated (PWM) signals based upon the first and second sensed operating parameters. Means are coupled to the first and second PWM signals for comparing the pulse widths thereof. The PWM signal having the narrower pulse width is coupled to a switch for controlling the current delivered to the exciter. The exciter current is therefore controlled in accordance with one of the sensed parameters at any particular time.

14 Claims, 5 Drawing Figures

VOLTAGE REGULATOR WITH INDEPENDENT PEAK AND AVERAGE VOLTAGE SENSING

DESCRIPTION

1. Technical Field

The present invention relates generally to alternator control circuits, and more particularly to a voltage regulator for controlling the output of a brushless alternator.

2. Background Art

Known brushless alternator systems comprising a main generator and an exciter for providing field current to the main generator include a voltage regulator for controlling the current delivered to a field winding of the exciter to in turn control the output voltage of the generator. These voltage regulators control exciter field current in accordance with either of the average of the three phase output voltage of the main generator or the highest phase voltage of the three phase output.

It has been found that the control of exciter field current in accordance with the average of the three phase output of the main generator is advantageous since a distorted wave shape at the output of the main generator does not necessarily result in a loss of voltage regulation. However, regulation based upon average sensing may not be completely effective to adequately control exciter field current in the event of an unbalanced load condition at the main genertor output. For example, in the event of a loss of one phase, the exciter field current may be increased to destruction levels in an attempt to compensate for the lost phase.

Voltage regulation based upon peak phase sensing has been found desirable to prevent exciter field current from exceeding a predetermined level. However, regulation based upon peak sensing is quite sensitive to noise in the output of the alternator, and hence control is difficult, if not impossible to maintain when the generator output is distorted.

One attempt at overcoming the above limitations is disclosed in Ejzak et al U.S. Pat. No. 4,403,292 assigned to the assignee of the instant application. This patent discloses a voltage regulator having a microprocessor which is coupled to a main generator output voltage sensing circuit. The microprocessor computes the average phase voltage and the peak phase voltage of the generator output and controls exciter field current in accordance therewith.

It has been found that the voltage regulator disclosed in the above-noted Ejzak et al patent does not provide optimal control of generator output. This is due to the fact that the average and peak sensing are accomplished by a single circuit, which in turn prevents the independent control of the generator output in accordance with either the average phase voltage or the high phase voltage.

Furthermore, it has also been found that the microprocessor cannot respond, under certain conditions, to an unbalanced load situation rapidly enough to prevent the generator output from becoming unstable. This is thought to be due to the unavoidable delay in the microprocessor in sensing the analog input voltages, converting the analog signals into digital signals, computing a required exciter field current and converting the field current information into an analog control signal to in turn control exciter field current.

DISCLOSURE OF INVENTION

In accordance with the present invention, a voltage regulator for a brushless alternator includes means for independently sensing two or more output parameters of the alternator and means for controlling the alternator output as a function of one of the sensed parameters.

In a preferred embodiment of the invention, the voltage regulator includes first and second sensing means for sensing the average of the three phase output voltage and the peak phase voltage, respectively. Means are coupled to the first and second sensing means for generating first and second pulse width modulated signals having a pulse width dependent upon the average voltage or the peak phase voltage, respectively. Means are coupled to the generating means for comparing the first and second pulse width modulated signals and passing only that pulse width modulated signal having the narrower pulse width. Means are responsive to the passed pulse width modulated signal for controlling the exciter to in turn regulate the output of the main generator.

The voltage regulator of the present invention permits independent control of the exciter field current in accordance with the sensed average voltage or the sensed peak voltage. Accordingly, the voltage regulator maintains control over the output of the main generator even in the event of transient disturbances or a loss of phase at the generator output.

Furthermore, the voltage regulator of the present invention quickly responds to unbalanced load conditions and hence the possiblity of unstable operation is minimized.

The present invention also utilizes a "power FET" transistor to control exciter field current. This voltage controlled device is simple to drive and hence the need for complex Darlington transistors and appropriate biasing circuits therefor is obviated.

BEST MODE FOR CARRYING OUT THE INVENTION

Figure 1:
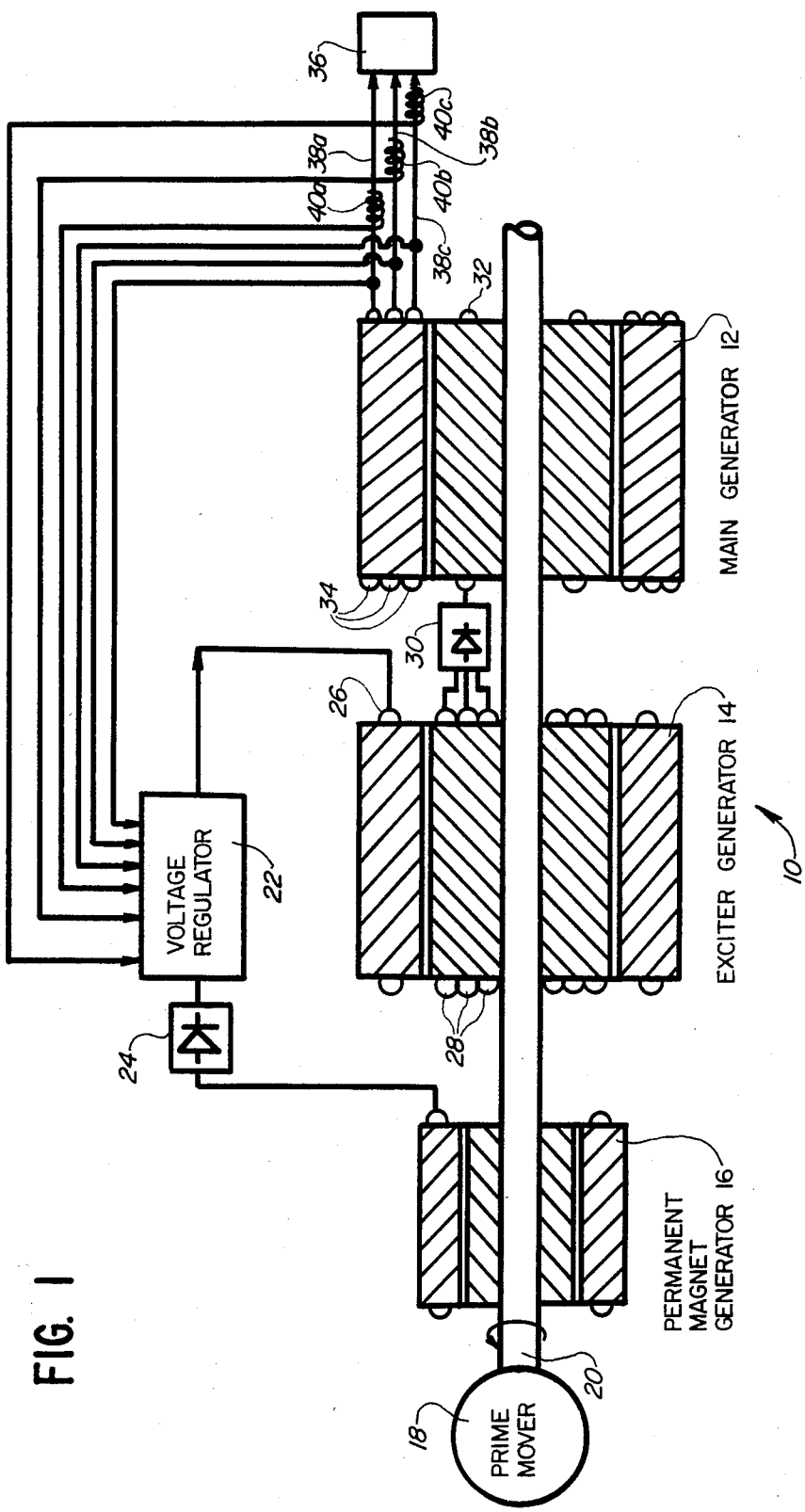
FIG. 1 is a combined diagrammatic illustration-block diagram of a brushless alternator system incorporating the voltage regulator of the present invention.

Referring now to FIG. 1, a brushless alternator 10 includes a main generator 12, an exciter 14 for providing main field current to the generator 12 and a permanent magnet generator, or PMG, 16. Each of the main generator 12, exciter 14 and PMG 16 are driven by a prime mover 18 through a common shaft 20.

A voltage regulator 22 receives the power developed by the PMG 16 via a rectifier 24 and delivers a controlled current to a field winding 26 of the exciter 14. The current level delivered to the field winding 26 is a function of two or more output parameters of the main generator 12, as discussed more specifically below.

As is conventional in brushless alternators, rotation of the shaft 20 by the prime mover 18 results in generation of a polyphase voltage in armature windings 28 of the exciter 14. This polyphase power is rectified by a rectifier bridge, illustrated generally at 30, and the rectified power is coupled to a field winding 32 of the main generator 12. The current in the field winding 12 and the rotation of the shaft 20 sets up a rotating magnetic field in space occupied by a set of main generator armature windings 34. The armature windings 34 develop polyphase output power which is delivered to a load 36 over a power bus 38 comprising at least three conductors 38a, 38b, 38c.

Output parameters of the main generator 12 are sensed at a point of regulation, or POR near the load. In the preferred embodiment, these parameters are the average of the three phase output voltage and the peak phase output voltage from the generator 12. This sensing is accomplished in the voltage regulator 22, as described more specifically hereinafter.

A third output parameter is sensed by means of differential protection current transformers, or DPCT's 40a, 40b, 40c which sense the phase currents in the power bus conductors 38a-38c, respectively. Signals representing these currents are coupled to the voltage regulator 22.

Figure 2:
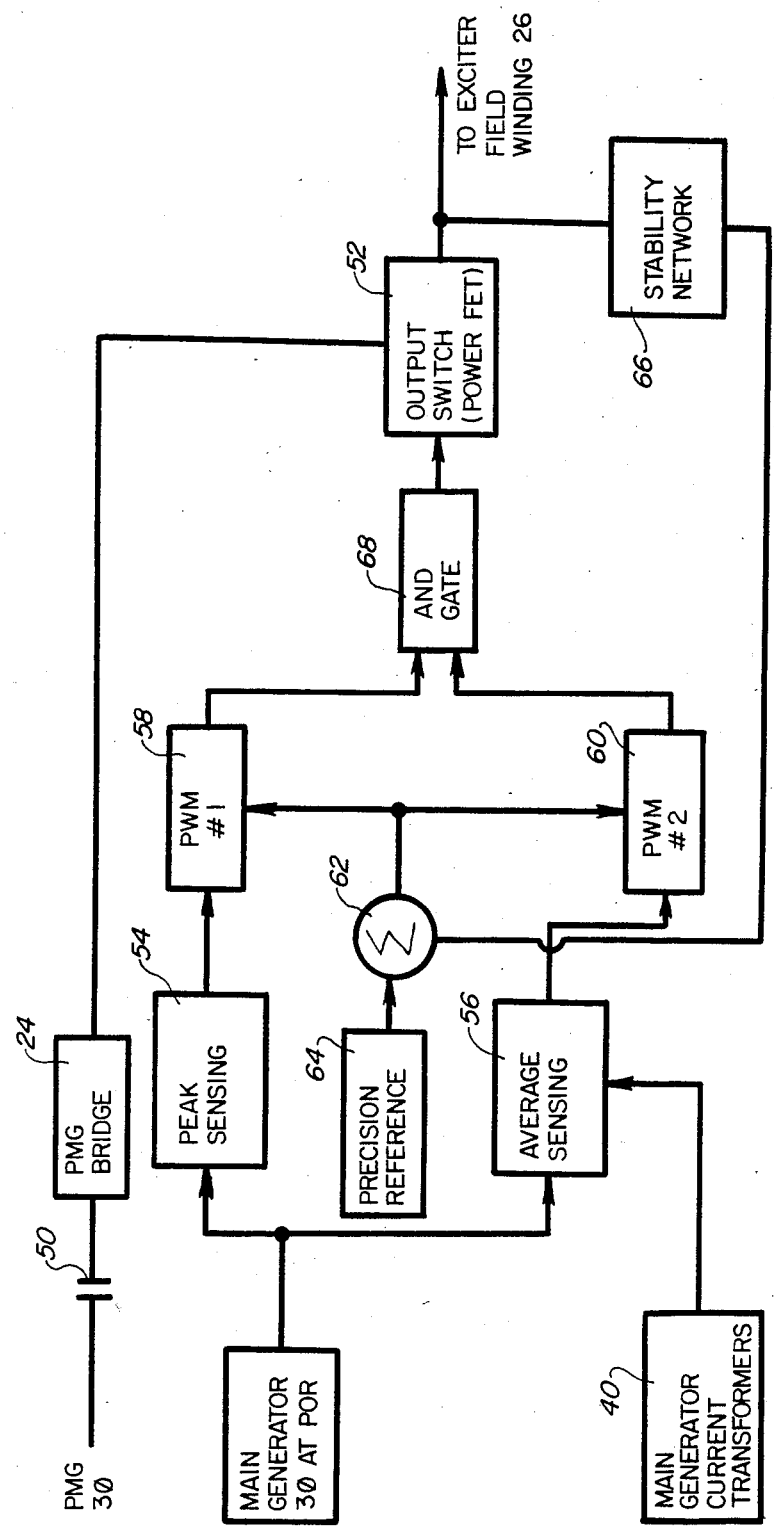
FIG. 2 is a block diagram of the voltage regulator shown in FIG. 1.

Referring now to FIG. 2, there is illustrated in block diagram form the voltage regulator 22 shown in FIG. 1. The polyphase output from the PMG 16 is coupled through a set of breaker contacts, illustrated generally at 50 to the bridge rectifier 24. The output of the rectifier 24 is coupled to an output switch 52 which, in the preferred embodiment, comprises a power FET. The output switch 52 is operated in a controlled fashion to modulate the flow of power to the exciter field winding 26.

The polyphase output voltage from the main generator is coupled to first and second sensing circuits 54,56 for sensing the peak or high phase voltage and the average of the polyphase output voltage, respectively. The outputs from the first and second sensing circuits 54,56 are coupled to first and second pulse width modulation or PWM amplifiers 58,60, respectively. The PWM amps 58,60 receive a signal from a summing junction 62 which develops an error signal representing the difference between the output of a precision reference circuit 64 and a feedback signal derived from the output of the power switch 52 and a stability network 66. The stability network 66 provides a low level negative feedback signal to the precision reference circuit 64 to prevent instability.

The second or average sensing circuit 56 also receives signals representing the current in each of the conductors 38a-38c from the DPCT's 40a-40c. The output of the average sensing circuit is modified in accordance with the output of the DPCT's 40 if the load current becomes excessive so that output voltage is reduced when an overcurrent condition arises.

The PWM amplifiers 58,60 develop pulse width modulated signals each having a pulse width dependent upon the output of the respective sensing circuit 54,56. The pulse width modulated signals have a frequency equal to 1200 hertz for a 400 hertz generator output when all three phases are present, 800 hertz when only two phases are present and 400 hertz when only one phase is present. The outputs from the PWM amplifiers 58,60 are coupled to an AND gate 68 which compares the pulse widths of the singals from the amplifiers 58,60 and passes the signal having the narrower pulse width to the output switch 52. The passed signal from the AND gate 68 controls the exciter field current, and hence the output of the main generator 12.

Figure 3:
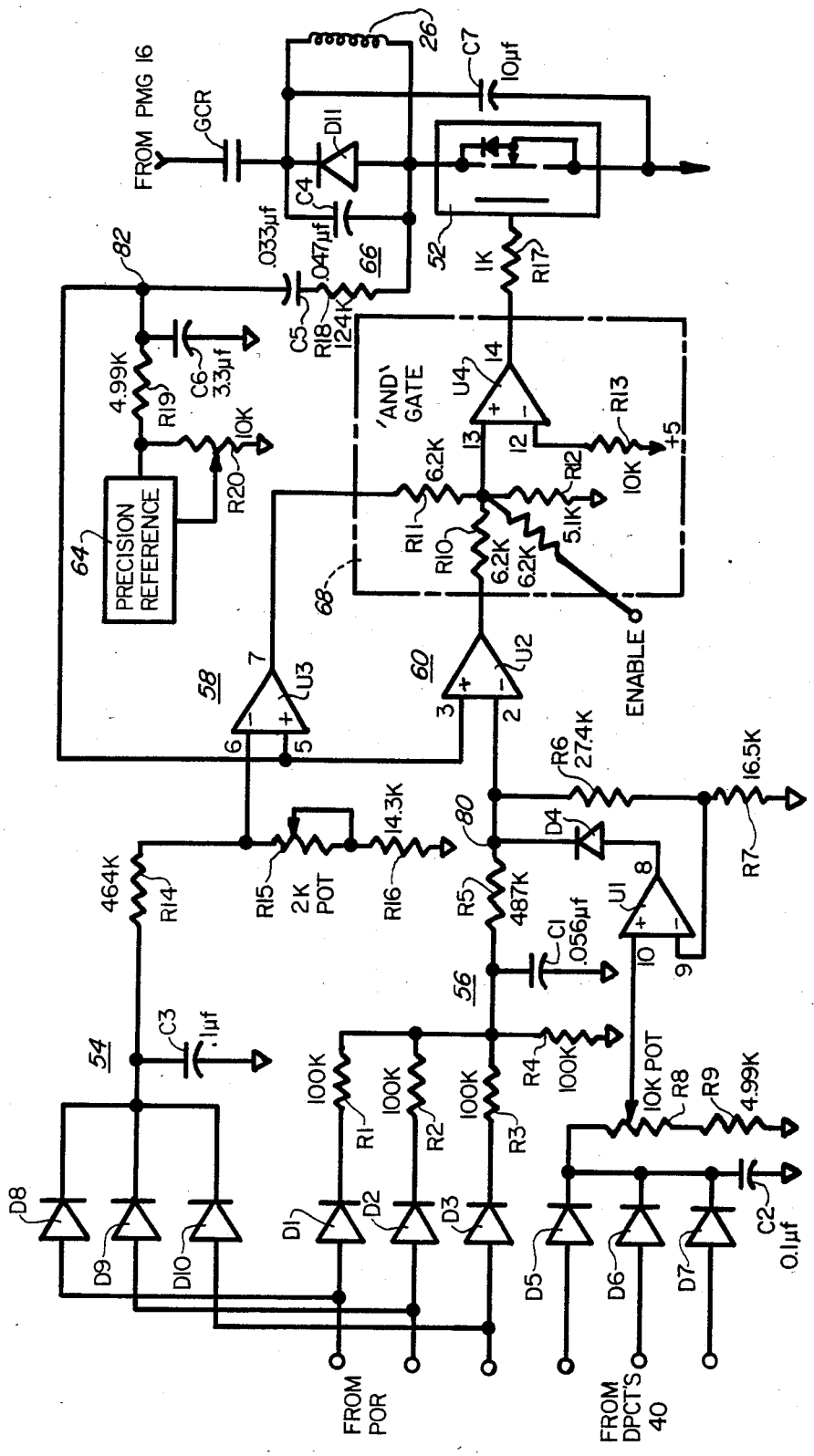
FIG. 3 is a schematic diagram of the voltage regulator shown in block diagram form in FIG. 2.

Referring now to FIG. 3, the POR voltage is coupled through three diodes D1–D3 and resistors R1–R3 to the parallel combination of a resistor R4 and a capacitor C1. As seen in FIG. 4B, the voltage $V_{C1}$ on the capacitor C1 is a DC level approximately equal to the average of the three phase output voltage of the main generator 12. The voltage $V_{C1}$ includes a series of ripple peaks caused by half-wave rectification and filtering of the POR voltage. The voltage across the capacitor C1 is combined at a node 80 with an output signal developed by an amplifier U1 which develops a series of pulses from the signals developed by the DPCT's 40. The output from the amplifier U1 represents the highest current of the polyphase output from the generator. The combined signal at the node 80 is utilized to limit the current to the exciter field, and hence to limit the generator output, by pulsing the AND gate 68 at a rate determined by the ripple on the signals from the DPCT's 40.

The node 80 is connected to the inverting input of an operational amplifier U2. The amplifier U2 also includes a noninverting input which is coupled to a node 82 which comprises the summing junction 62 shown in FIG. 2. The signal from the node 80 normally varies between limits which are above and below the level of the signal from the node 82. The amplifier U2 compares the signals from the nodes 80,82 and, due to the high gain thereof, produces a pulse width modulated wave having a pulse width which is a function of the limits on the signal from the node 80 and the level of the signal at the node 82. The output from the amplifier U2 is coupled to a resistor R10 comprising one input of the AND gate 68.

A second input to the AND gate, comprising a resistor R11, is coupled to the output of the first PWM amplifier 58. The amplifier 58 includes an operational amplifier U3 having a noninverting input which is coupled to the node 82 and an inverting input which is coupled to a series of diodes D8–D10 and a capacitor C3 through a resistor R14. The diodes D8–D10 are in turn coupled to the three phase output of the generator 12 at the point of regulation POR.

The AND gate may be provided with a further input which receives an enable signal. If the enable signal is low, the AND gate output is disabled to shut off the regulator. If the enable signal is high, the AND gate is enabled to permit control of the exciter field.

Figure 4A:
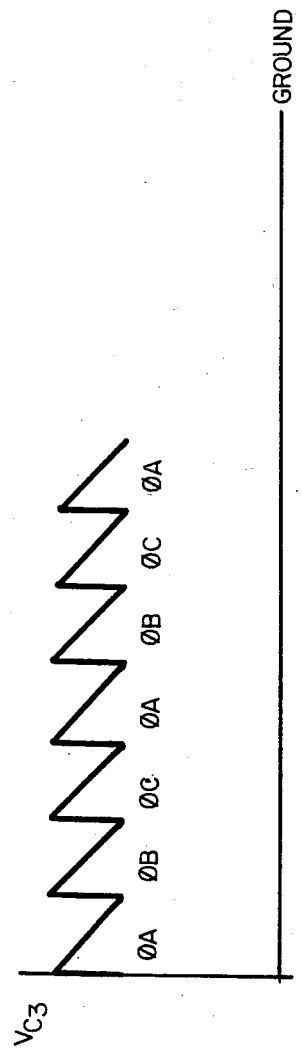
FIGS. 4A and 4B are waveform diagrams illustrating the operation of the voltage regulator shown in FIG. 3.
Figure 4B:
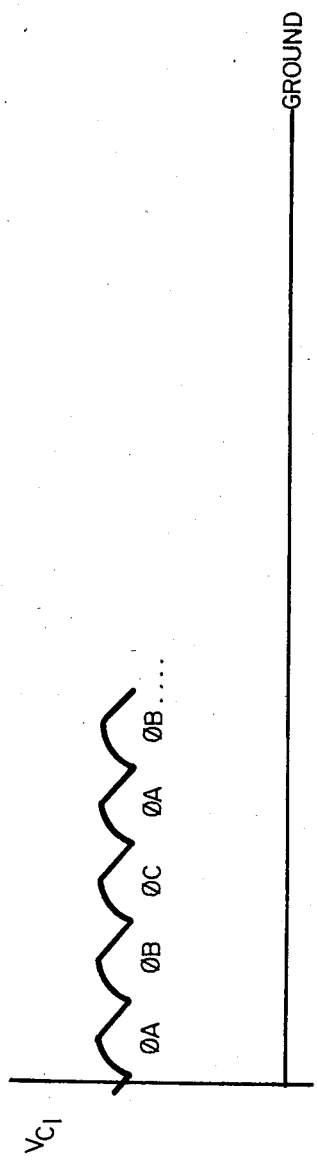

As seen in FIG. 4A, the signal coupled to the inverting input of the amplifier U3 is a sawtooth wave which varies in amplitude between limits. This sawtooth wave is compared against the reference voltage from the node 82 to develop a PWM signal having a pulse width dependent upon the limits of the sawtooth wave and the level of the signal from the node 82.

A potentiometer R20, connected to the precision reference 64, is adjustable to permit varying reference levels to be set representing the desired POR voltage.

The output of the AND gate 68 is coupled to the gate electrode of the power FET 52 through a resistor R17 which controls the rise time of the gate drive to the FET.

The PMG is coupled to the exciter field winding 26 through a set of contacts GCR, operated by a generator control unit (not shown). A capacitor C4 filters out noise generated by switching action of the power FET.

Under normal operating conditions (normal operation being steady-state operation including short circuit and transient response), the signal from the PWM amplifier 60 has a narrower pulse width than the signal from the PWM amp 58 and hence the switch 52 is controlled in accordance with the output from the amplifier U2. Hence, under normal conditions, the current delivered to the exciter field is controlled as a function of the average of the three phase output voltage. However, when a phase drops out or is heavily loaded, the output signal from the PWM amp 58 has a narrower pulse width than the output from the PWM amp 60 and hence the switch 52 and the current to the exciter field are controlled in response to the high phase voltage as sensed by the sensing circuit 56.

The high phase limiting will continue until one phase becomes loaded to a point where current limiting becomes effective via the amplifier U1 or until normal conditions are restored.

It should be noted that if either of the sensing circuits 54,56 becomes disconnected from the output of the generator, the output of the corresponding PWM amp 58 or 60 is forced high, thereby permitting control to be continued by the remaining sensing circuit. This feature allows for control the AND gate 68 under such a condition.

The use of a power FET as the switch 52 is desirable since the transistor is a voltage controlled device requiring very little current. Hence, control of the exciter field is facilitated since a low power logic device (i.e. the AND gate 68) may be used to effect direct control.

It should be noted that the PWM amplifiers can be controlled, if desired, so that the pulse widths of the signals developed thereby remain within predetermined limits. This could be used to establish, for example, a maximum current limit for the generator.

The present invention is effective to control generator output over a wide range of operating conditions. Moreover, the system is not limited to the sensing of the output voltage and/or current but may be responsive to other parameters, as desired.

We claim:

1. A voltage regulator for a generating system having a main generator and an exciter for providing field current to the main generator, comprising:
    means coupled to the main generator for sensing first and second operating parameters thereof;
    means coupled to the sensing means for generating first and second pulse width modulated (PWM) signals based upon the first and second sensed operating parameters, respectively;
    means coupled to the generating means for comparing the first and second PWM signals and passing only that PWM signal having the narrower pulse width; and
    means responsive to said passed PWM signal for controlling the exciter to in turn regulate the output of the main generator.

2. The voltage regulator of claim 1, wherein the main generator develops polyphase output voltages and wherein the sensing means includes means for sensing the average of the polyphase output voltages and the peak phase voltage.

3. The voltage regulator of claim 1, wherein the comparing means comprises an AND gate.

4. The voltage regulator of claim 1, wherein the sensing means includes means for developing a signal representing the first and second operating parameters and wherein the generating means includes second and third means coupled to the developing means for comparing the signals representing the first and second sensed parameters with a reference signal, each comparing means generating an output having a high or low state depending upon the relative levels of the respective parameter signal and the reference signal coupled thereto to generate the PWM signals.

5. The voltage regulator of claim 1, wherein the controlling means comprises a FET coupled to the exciter field winding.

6. The voltage regulator of claim 3, wherein the controllng means comprises a FET having a gate electrode coupled to the output of the AND gate.

7. A voltage regulator for a generating system having a main generator and an exciter for providing field current to the main generator, comprising:
    first means for developing a first signal representing a first parameter of the output voltage of the main generator;
    second means for developing a second signal representing a second parameter of the output voltage of the main generator;
    means for converting the first and second signals into first and second pulse width modulated (PWM) signals each having a pulse width dependent upon the level of the respective first or second signal relative to a reference; and
    means responsive to only one of the PWM signals at any time for controlling the exciter to in turn regulate the output of the main generator.

8. The voltage regulator of claim 7, wherein the main generator develops a polyphase output voltage and wherein the first and second developing means includes means for developing signals representing the average of the polyphase output voltage and the peak phase voltage, respectively.

9. The voltage regulator of claim 8, wherein the converting means includes first and second PWM amplifiers each having a first input coupled to the respective first or second signal, a second input coupled to a reference and an output coupled to the controlling means.

10. The voltage regulator of claim 9, wherein the controlling means includes an AND gate having inputs coupled to the outputs of the first and second PWM amplifiers for comparing the pulse widths of the first and second PWM signals, the AND gate passing the PWM signal having the narrower pulse width, the controlling means further including a power switch coupled to the output of the AND gate for controlling the current delivered to the exciter in accordance with the passed PWM signal.

11. The voltage regulator of claim 7, wherein the main generator develops a three phase output voltage and wherein the first developing means includes means for generating an average signal representing the average of the three phase output voltage, means for generating a high phase current signal representing the highest phase current in the three phase output and means for combining the average signal with the high phase current signal to derive the first signal.

12. A voltage regulator for a brushless alternator having a main generator which develops three phase output power, an exciter for providing field current to a field winding of the main generator and a permanent magnet generator (PMG) for providing field current to a field winding of the exciter, comprising:
    first means for developing a first signal representing the average of the three phase output voltage of the main generator;
    a reference signal source for generating a reference signal;

a first comparator having a first input coupled to the first developing means, a second input coupled to the reference signal source and an output which develops a first pulse width modulated (PWM) signal in accordance with the comparison of the signals at the first and second inputs;

second means for developing a second signal representing the peak phase output voltage of the main generator;

a second comparator having first and second inputs coupled to the second developing means and the reference signal source, respectively, and an output which develops a second PWM signal in accordance with the comparison of the signals at the inputs;

an AND gate coupled to the outputs of the first and second comparators for comparing the pulse widths thereof, the AND gate passing to an output thereof the PWM signal having the narrower pulse width; and means coupled to the PMG and the field winding of the exciter for controlling the exciter field current in accordance with the passed PWM signal.

13. The voltage regulator of claim 12, wherein the controlling means comprises a power FET.

14. The voltage regulator of claim 12, further including means for developing a signal representing the highest phase current in the main generator output and means for generating a combined signal representing the combination of the highest phase current signal and the first signal, the first comparator receiving the combined signal at the first input.

* * * * *